Figure 1:
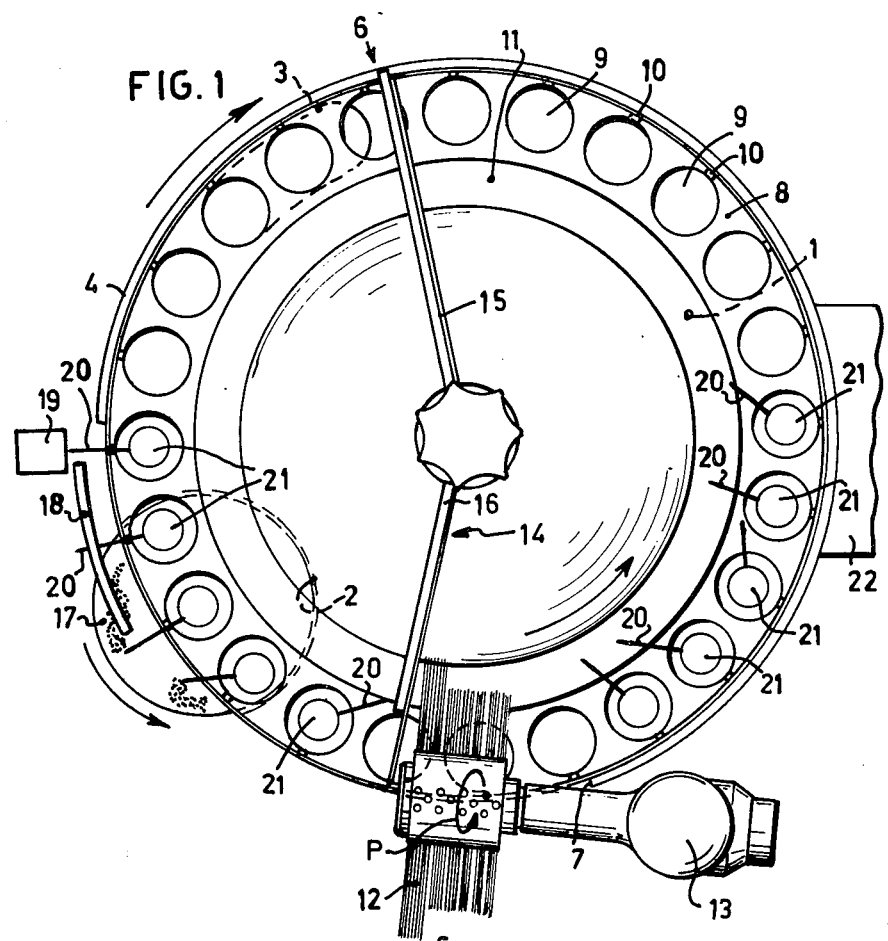

United States Patent [19]

Derckx

[11] 4,024,058
[45] May 17, 1977

[54] SORTING AND DIRECTING PLANT FOR LOLLIPOPS

[76] Inventor: Henricus Antonius Jacobus Maria Derckx, St. Antoniusstraat 31, Weert, Netherlands

[22] Filed: Apr. 8, 1976

[21] Appl. No.: 674,713

[30] Foreign Application Priority Data

Apr. 16, 1975 Netherlands ............... 7504506

[52] U.S. Cl. .................................. 209/73; 209/80
[51] Int. Cl.² ........................................ B07C 5/34
[58] Field of Search ............ 209/72, 73, 74 R, 75, 209/77, 80, 88 R, 88 S, 88.5, 90, 96

[56] References Cited

UNITED STATES PATENTS

| 1,531,081 | 3/1925 | Dondero et al. | 209/73 |
| 2,578,573 | 12/1951 | Mills | 209/88 R |
| 3,236,375 | 2/1966 | Brenner et al. | 209/88 R |
| 3,250,388 | 5/1966 | Eggers | 209/90 X |
| 3,432,033 | 3/1969 | Everett | 209/73 |
| 3,498,452 | 3/1970 | Aronstein et al. | 209/90 X |

Primary Examiner—Drayton E. Hoffman
Assistant Examiner—Fred A. Silverberg
Attorney, Agent, or Firm—Ladas, Parry, Von Gehr, Goldsmith & Deschamps

[57] ABSTRACT

A sorting and directing plant for lollipops supplied via a hopper comprising a first rotating disc, provided at its periphery with holes each having a slot extending radially outwards, a stationary disc below the disc and a second rotating disc incorporated in a circular recess of the stationary disc and positioned in its plane, of which disc the direction of rotation is contrary to that of the rotating disc over it and of which the center lies substantially on the pitch circle of the centers of the holes in the disc.

8 Claims, 3 Drawing Figures

SORTING AND DIRECTING PLANT FOR LOLLIPOPS

The present invention relates to a sorting and directing plant for lollipops.

In order to be able to subject the lollipops to a certain processing they are to be sorted and directed in such a way that the lollipop sticks can be engaged and discharged by a device to a place where the lollipops can be processed further. This place may, e.g., be a packaging device.

Since the sorting and directing of the lollipops took place manually, thus far, this inter-processing was very time consuming.

In order to eliminate the above-mentioned drawback a sorting and directing plant according to the invention is suggested which plant is characterized by a first rotating disc provided at its periphery with holes each with a slot extending radially outwards, a stationary disc positioned below the first mentioned disc, and a second rotating disc incorporated in a circular recess of the stationary disc and situated in the plane of the disc of which second disc the direction of rotation is contrary to that of the rotating disc above it and of which the centre is situated substantially on the pitch circle of the centres of the holes in the first disc.

Furthermore, it is suggested, according to the inventon to have the surface of the second disc consist of a material having a high friction coefficient.

According to another characterizing feature of the invention a third obtuse conical rotating disc is positioned over the first rotating disc the direction of rotation of which is contrary to that of the first disc.

In order to maintain the lollipops in the correct position, when they have been directed in the correct way, a member to maintain the lollipop sticks horizontal is positioned concentrically in respect of the first disc at the place of the second disc and at some distance from this disc, said member terminating at a place where the lollipops are discharged.

In order to prevent that more than one supplied lollipop get into the holes of the first rotating disc, a driven rotating brush is provided, according to the invention, the axis of which is situated in the tangential plane of the first disc.

Figure 2:
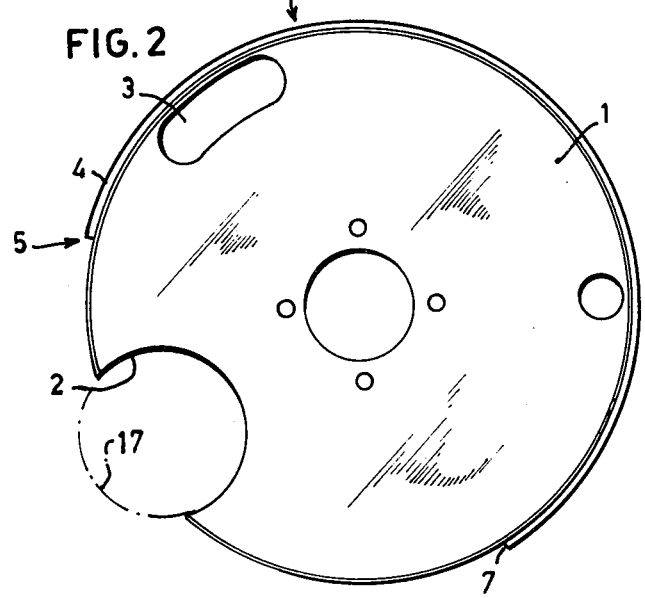
Figure 3:
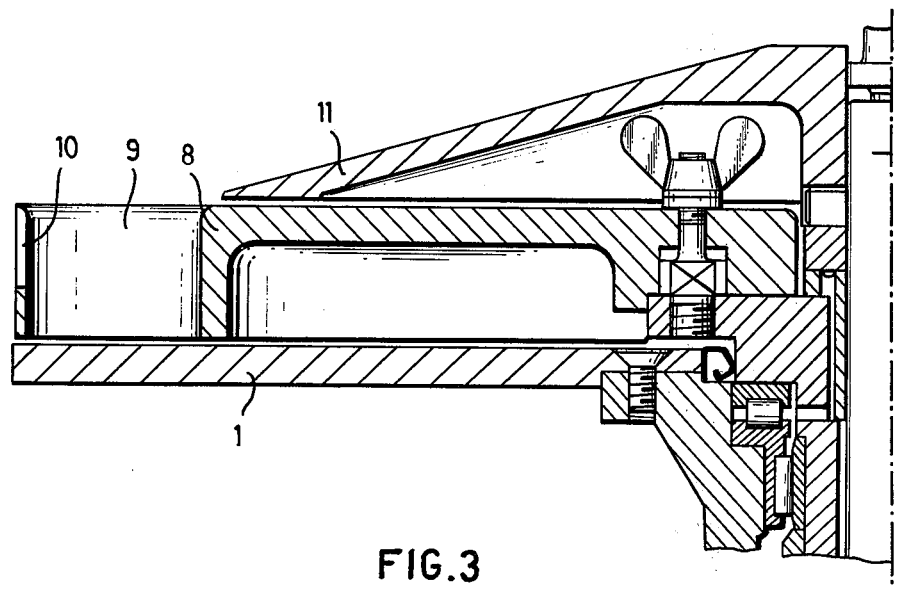

The invention now will be further elucidated by way of the description and the annexed drawings:

FIG. 1 being a plan view of the present sorting and directing plant; FIG. 2 representing, on a reduced scale, the stationary disc pertaining to the plant represented in FIG. 1;

FIG. 3 being a section of the plant represented in FIG. 1.

The sorting and directing plant represented comprises a stationary disc 1 which is provided with a circular recess 2 and a discharge opening 3. As indicated in FIG. 2 the periphery of the stationary disc has a rising vertical edge 4, which starts at 5, merges at 6 in an upstanding edge of constant height and ends at 7. Over this stationary disc 1 a first rotating disc 8 is present provided at its periphery with holes 9 each having a slot 10 directed radially outwards. Over this rotating disc 8 an obtuse conical rotating disc 11 is provided, the peripheral edge of which ends in front of the holes 9 and the direction of rotation of which is contrary to that of the rotating disc 8.

As indicated, particularly in FIG. 1, a brush 12 is positioned in the tangential plane of the rotating disc 8, the direction of rotation of which brush is indicated by the arrow P and which is driven by a motor, not represented further, by means of a right angled transmission 13.

Over the obtuse conical disc 11 a baffle member 14 is positioned consisting in the present example of two baffle plates 15 and 16 buckled in respect of each other. At the place of the holes 9 the baffle plates 15 and 16 leave open a space such that the lollipop incorporated in a hole 9 can pass unhindered.

As indicated by FIG. 1 a small rotating disc 17 is positioned in the circular recess 2 of the stationary disc 1 and in its plane, of which disc 17 the direction of rotation is contrary to that of the rotating disc 8. The surface of this rotating disc 17 consists of a material having a high friction coefficient.

Concentrical to the rotating disc 8 and at some distance over the rotating disc 17 a member 18 is present to maintain the lollipop sticks 20 horizontal, the member 18 beginning just past the centre of the rotating disc 17, seen in the direction of rotation of the disc 8, and ending just in front of the discharge device 19 which has been represented diagrammatically only.

The operation of the present sorting and directing plant is as follows:

The lollipops 21 with their sticks 20 are supplied through a hopper 22 and then arrive in disordered condition in the holes 9 of the rotating disc 8. It is not hypothetical that more than one lollipop get into a hole 9. It is the purpose of the brush 12 to remove the superposed lollipop from the hole 9 which brush throws the lollipop back onto the obtuse conical disc 11 by which, as a result of the direction of rotation of this disc 11, it is returned and arrives in a free hole of the rotating disc 9. In this way a maximum occupation of the holes 9 by the lollipops is achieved. Each lollipop situated in the hole 9 can pass the baffle plate 16 unhindered, it is not necessary however, that the lollipop sticks 20 are directed radially outwards already.

The directing radially outwards of the lollipop sticks, the latter then lying in the slot 10, is acieved by the rotating disc 17. When, however, the holes with the lollipops directed in the correct way herein, seen in the direction of rotation of the rotating disc 8, pass the centre of the rotating disc 17, the lollipop sticks 20, as a result of the rotating movement of the disc 17, again tend to rise. In order to prevent the latter the member 18 is present by which the lollipop sticks are pushed downwards and maintained horizontal. Finally the lollipop sticks 20 are engaged by the discharge device, diagrammatically indicated at 19, and removed from the holes 9.

When the lollipops do not have sticks or when the sticks are bent in such a way that they cannot be engaged by the device 19, these lollipops are discharged through the opening 3 in the statonary disc 1. To facilitate the discharge of such lollipops the stationary disc 1 has a rising edge 4 by which the sticks are guided and raised, so that the lollipops can be discharged easily through the opening 3.

Since the drive and the positioning of the discs 1, 8 and 11, as represented in FIG. 3, do not form a art of the present invention, they will not be entered into more elaborately.

It is obvious that the present plant is not intended exclusively for sorting and directing lollipops, but that the plant is suitable also for sorting and directing any object which is provided with a globular head and a rod-shaped protrusion connected therewith.

What is claimed is:

1. A sorting and directing plant for lollipops supplied via a hopper comprising a first rotating disc, provided at its periphery with a plurality of holes each having a slot extending radially outwards, a stationary disc below the first disc and a second rotating disc incorporated in a circular recess of the stationary disc and positioned in its plane, the direction of rotation of said second rotating disc being contrary to that of the first rotating disc over it and the center of said second rotating disc lying substantially on the pitch circle of the centers of the holes in the first rotating disc, and a third obtuse conical rotating disc being positioned over the first rotating disc the direction of rotation of which is contrary to that of the first rotating disc.

2. A plant according to claim 1, wherein the surface of the second disc consists of a material having a high friction coefficient.

3. A plant according to claim 2, further comprising a member which is positioned concentrically in respect of the first rotating disc at the location of the second rotating disc and at some distance over it whereby the lollipop sticks are maintained horizontal, this member ending at a location where the lollipops are discharged.

4. A plant according to claim 1, further comprising a vertical baffle member which is positioned diametrically over said first and third discs.

5. A plant according to claim 4, wherein over the first rotating disc and in front of the baffle member as seen in the direction of rotation of the first disc, a driven rotating brush is positioned so that its axis lies in the tangential plane of the first rotating disc.

6. A plant according to claim 1, wherein the stationary disc has a discharge opening therein for damaged lollipops.

7. A plant according to claim 5, wherein the peripheral portion of the stationary disc, defined by the baffle member, has an upstanding edge at the side of a supply hopper.

8. A plant according to claim 7, wherein the stationary disc has a rising edge between a discharge device and a baffle plate.

* * * * *